May 31, 1955  J. B. SEBOK  2,709,498
AIR CLEANER ASSEMBLY
Filed Feb. 18, 1952  2 Sheets-Sheet 1

Inventor:
Joseph B. Sebok
by Hill, Sherman, Meroni, Gross & Simpson
Attys

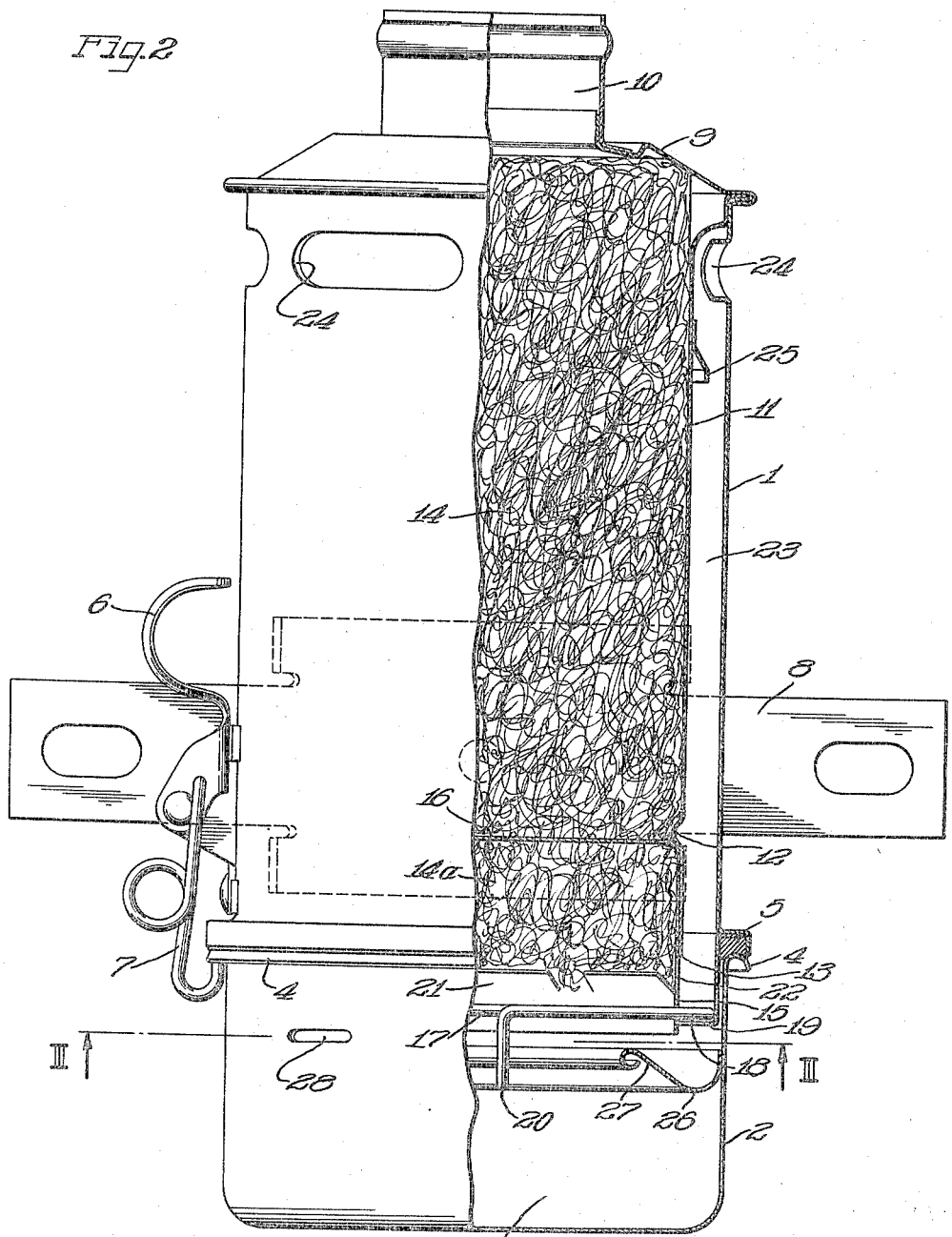

United States Patent Office 2,709,498
Patented May 31, 1955

2,709,498

AIR CLEANER ASSEMBLY

Joseph B. Sebok, Detroit, Mich., assignor to Houdaille-Hershey Corporation, Detroit, Mich., a corporation of Michigan Application February 18, 1952, Serial No. 272,153

5 Claims. (Cl. 183—15)

The present invention relates to an air cleaner assembly, and more particularly to an air cleaner assembly highly desirable for use in association with internal combustion engines carried by military vehicles, although the invention will have other uses and purposes as will be apparent to one skilled in the art.

By way of example, but not by way of limitation, it may be pointed out that in the past extreme difficulty has been experienced in endeavoring to provide a suitable air cleaner for the generator engine of a military tank. Owing to the limited space in the tank, the air cleaner must be mounted in the crew compartment, while the generator engine which is usually only a one cylinder engine, is mounted in the engine compartment. Since the air cleaner must be mounted in the crew compartment, it cannot be increased in diameter, because the only room for it is between the hull of the tank and the turret gun basket, and the diameter must be specifically limited to that space. In addition, owing to the fact that the generator engine is most frequently a one cylinder engine, there is terrific blow-back or back pressure through the air cleaner in a reverse direction, which is even worse than that created by an air compressor. Heretofore, such terrific blow-back resulted in the throwing of an excess quantity of oil or other cleansing liquid from the liquid sump into the filter mass of the air cleaner, and pull over of cleansing liquid into the carburetor of the engine resulted. As stated above, such pull over could not be cured by increasing the diameter of the air cleaner, because there is no room to do so.

In addition, by virtue of the mounting of the air cleaner in the crew compartment of the tank, it is necessary to provide an intake silencer, and in the customary disposition, the silencer is a relatively elongated element mounted on top of the air cleaner. Consequently the air cleaner must be mounted very low, and therefore it frequently is impossible to see beneath the air cleaner, and when the cleaner is serviced, the liquid cup, and a portion of the filter if so desired, must be removed and replaced by feel alone. That was substantially impossible with air cleaners of the type heretofore known.

With the foregoing in mind, it is an important object of the instant invention to provide an air cleaner of the liquid bath type, designed to eliminate pull over of cleansing liquid into the apparatus with which the cleaner is associated, regardless of the frequency and amount of blow-back or back pressure through the cleaner.

Another object of the invention is the provision of an air cleaner of the liquid bath type, embodying structure therein to prevent pull over of cleansing liquid into the apparatus with which the cleaner is associated, as a result of back pressure or blow-back through the air cleaner, and without the necessity of increasing the diameter of the air cleaner for that purpose.

It is also a feature of this invention to provide a liquid bath air cleaner including a combination of louver-like elements in the lower part of the filter holding shell, and baffle means thereadjacent constructed to cooperate in quickly nullifying any turbulence of cleansing liquid caused by a blow-back, thus eliminating the danger of pull over of cleansing liquid into the carburetor or other apparatus connected with the air cleaner.

It is a further feature of the invention to provide a liquid bath air cleaner involving a two part filter holding shell, with filter means in each part thereof, and wherein only the lower part which catches most of the dirt is removable for cleansing.

Still a further object of the invention resides in the provision of a liquid bath air cleaner so constructed that it can readily be serviced by removal of the liquid cup, and removal of at least a part of the filter if desired, without the need of such parts being visible to the operator at the time of servicing.

It is also a feature of the invention to provide a liquid bath air cleaner in which the lower part of the filter mass is held in place by a simply actuated element and is readily removable and properly replaceable with ease, even when mounted so as to be invisible to the operator while servicing the cleaner.

Another important feature of the invention is the provision of an air cleaner, answering all of the aforementioned desiderata, which is simple in construction, long lived, and very economical to manufacture.

While some of the more salient features, characteristics and advantages of the instant invention have been above pointed out, others will become apparent from the following disclosures, taken in conjunction with the accompanying drawings, in which—

Figure 2 is a part side elevational, part vertical sectional view of the structure of Fig. 1.

As shown on the drawings:

Figure 1:
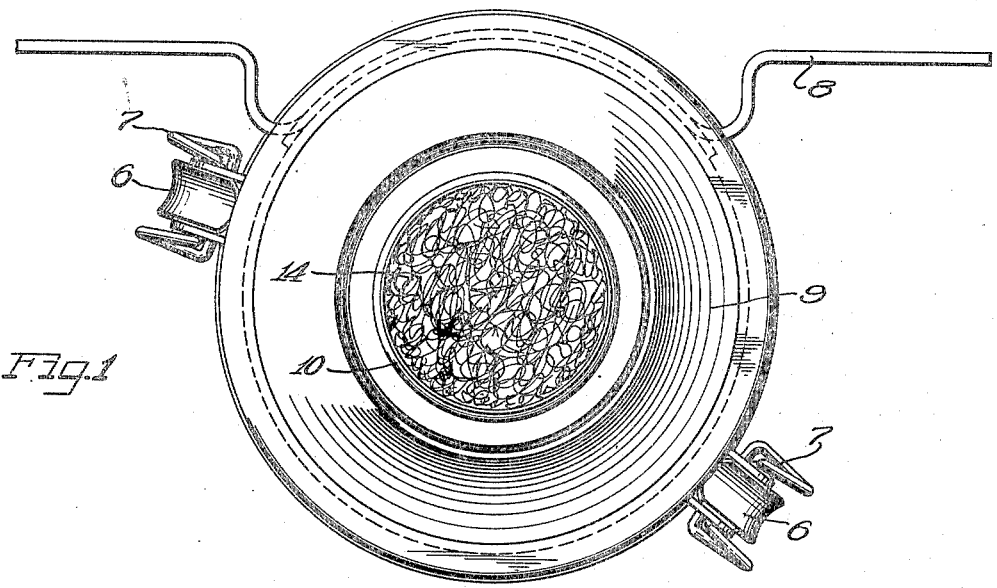
Figure 1 is a top plan view of a liquid bath air cleaner embodying principles of the instant invention.

In the illustrated embodiment of the instant invention, there is shown an outer casing comprising separable sections, including an upper section 1 and a lower section 2, the latter being in the form of a cup defining a sump 3 for cleansing liquid, such as crankcase oil. A reversely turned upper margin 4 is provided on this cup-like section 2 which seats against an annular gasket 5 carried by any suitable gasket holding arrangement on the upper casing section. The two sections are held together in air tight relationship when in operative position, by means of a pair of over center snap clamps mounted on the upper casing section 1, and each of which comprises a thumb lever 6 pivotally connected to a spring element 7 having an upwardly turned end to engage inside the margin 4 on the lower section 2, as clearly seen in Fig. 2. The upper casing section also has attached thereto a suitable mounting bracket 8 for supporting the entire cleaner.

The upper section 1 is provided with a top or cover portion 9, and in the illustrated instance, the outlet conduit 10 for cleaned air rises centrally from this cover. Inside the upper casing section is a filter holding shell 11 which is imperforate in the side wall thereof, and which is provided with an inward annular bead 12 near its lower end, this shell in the illustrated instance terminating at the point 13, seen in Fig. 2. Inside the filter holding shell is a mass of filtering material 14 which may be of any suitable material such as vegetable fiber, wavy wire, curled animal hair, etc. Obviously, if so required by the Underwriters, a suitable holding screen may be provided at the top and the bottom of the filter mass. The filter mass extends down to the bead 12 and is fixedly retained by that bead inside the shell 11.

A second portion of the filter mass, designated 14a, is disposed inside a shell 15 which telescopes inside the lower portion of the shell 11 up to the bead 12, as clearly seen in Fig. 2. The top of the shell 15 is of substantially spider form as indicated at 16, leaving relatively large openings between the legs of the spider formation.

During operation, most of the dirt that is not washed back into the liquid sump, but remains in the filter mass, will be in the portion of the mass 14a. Consequently it will only be necessary to periodically service that portion of the entire filter mass, and the part 14 of the mass will not need the servicing operation. Therefore, the part 14a is made removable by the removal of the shell 15.

The lower shell is removably retained in operating position by means of a simple snap ring retaining element 17, which is open ended and somewhat in the form of a flattened loop. Oppositely projecting portions 18—18 of this holding element extend through suitable openings or slots in the wall of the lower shell 15 and engage over an inwardly extending flange or annular shoulder 19 at the lower end of the upper casing section 1. The open ends of the ring 17 terminate in inwardly disposed and depending loops 20—20 which may be grasped between the finger and thumb and moved toward each other to compress the ring and release the shell section 15, by pulling the portions 18—18 of the ring inside the shoulder 19 on the upper casing section. It is never necessary for the holding ring 17 to be withdrawn through the slots in the wall of the shell 15.

Figure 3:
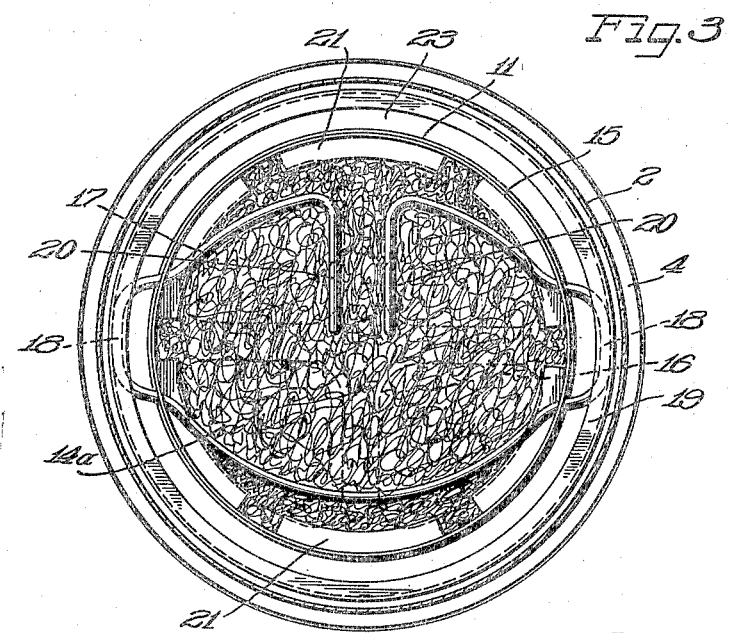
Figure 3 is a bottom plan sectional view taken substantially as indicated by the line III—III of Fig. 2, looking in the direction of the arrows.

For the purpose of nullifying turbulence created by blow-back or back pressure through the cleaner, relatively wide tongues 21 are struck inwardly from the wall of the lower shell 15 and extend obliquely upwardly and inwardly beneath the filter mass 14a, as seen in Figs. 2 and 3. The striking in of these tongues leaves apertures 22 in the wall of the shell 15 through which a portion of the air and cleansing liquid driven by back pressure may be diverted.

From the showing in Fig. 2 particularly, it will be noted that the upper filter holding shell 11 as well as the lower shell 15 are of less diameter than the casing 1 so as to provide an annular downwardly leading passage 23 for incoming air. The upper portion of the casing 1 is provided with a number of inwardly flanged air inlet openings 24, and on the outer side of the filter holding shell 11 below these flanged inlet openings is an outwardly projecting annular baffle 25. The flanges on the opening extend inwardly just beyond the outer extent of the baffle 25, to lend added insurance against any oil or cleansing liquid being blown back out the inlet passage 23. The baffle 25 prevents cleansing liquid under the influence of powerful pulsating pressure from climbing up the outside of the filter holding shell to a point adjacent the inlet.

The lower cup-like section 2 has secured therein, as by spot welding or equivalently, an annular trough-like baffle 26, the deeper portion of which is disposed directly beneath the annular inlet path 23. The inner wall of the baffle extends obliquely upwardly as indicated at 27, and is substantially parallel to the wide tongues 21 struck in from the wall of the filter holding shell 15.

In operation, the instant cleaner is quite simple and highly efficient. A supply of cleansing liquid is placed in the cup section 2 to the point indicated by a depression 28 in this section. Upon starting of the engine to which the outlet 10 of the cleaner is connected, air is sucked through the cleaner into the carburetor of the engine. The air enters the inlet openings 24, descends in the passage 23, strikes the oil contained in the cup above the baffle 26, and immediately drives that quantity of oil into the filter mass 14a. Thereafter, as dirt laden liquid descends from the filter mass and gravitates to the bottom of the sump, that portion of the cleansing liquid in the filter mass is replenished by aspiration through the opening in the center of the baffle 26 due to the travel of incoming air over the part 27 of the baffle. A complete circulation of the cleansing liquid is set up in the lower portion of the filter mass, and particularly in the part 14a. Most of the dirt removed from the air gravitates out of the filter mass down into the bottom of the sump. However, some will remain in the filter mass, so that periodically the mass should be cleansed by swishing it in gasoline, kerosene, or some other volatile liquid. Since only the lower portion of the mass will become dirt contaminated, it is only necessary to clean the part 14a, and to accomplish this, release of the levers 6—6 on the clamp permits the lower casing section 2 to be dropped off the cleaner, and thereafter the loops 20—20 on the holding ring 17 may be compressed to release the lower filter holding shell 15. It is not necessary for the operator to actually see these parts to effect the removal of the lower shell 15. It can be done very expeditiously by feel alone. Obviously, the parts may be replaced just as easily and by feel alone. It should be noted, that the filter mass 14a need not be serviced as often as the liquid cup 2 is emptied of dirty liquid and accumulated dirt and replenished with new cleansing liquid.

When the air cleaner is associated with a single cylinder internal combustion engine, such as a generator engine utilized in a military tank, blow-back or back pressure through the cleaner is frequent and heavy. Without the relatively wide tongues 21 struck inwardly from the wall of the shell 15, blow-back would cause liquid to splash upwardly through the opening in the baffle 26, and into the filter mass thereabove and repeated blow-back would cause such liquid to saturate the filter mass well up into the mass 14. Consequently, in a short time liquid from the mass 14 would be pulled over into the carburetor of the engine. As stated before herein, pull over cannot be cured by enlarging the diameter of the cleaner and thus providing more filter mass, because space does not permit that. Likewise, it cannot be cured by making the filter mass longer or higher because it would require only a comparatively short period of time with the frequent and powerful blow-backs to cause the liquid to rise sufficiently high for pull over.

However, with the present invention, upon blow-back, a goodly portion of the air and liquid driven in a reverse direction through the cleaner will be guided outwardly and downwardly through the openings 22 by the tongues 21 into the then comparatively dry trough of the baffle 26, and that liquid and air will be forcefully turned inwardly and upwardly over the portion 27 of the baffle into direct conflict with any liquid trying to rise through the opening in the baffle. Thereby, turbulence of the liquid is substantially immediately nullified, and the liquid cannot rise sufficiently in the filter mass to result in pull over.

From the foregoing, it is apparent that I have provided a liquid bath air cleaner which may readily and easily be serviced by an operator without the parts undergoing servicing being visible to the operator during removal and replacement thereof. Further, the cleaner automatically compensates for very powerful and frequent blowback or back pressure and effectively eliminates any chance of pull over of cleansing liquid into the carburetor to which the air cleaner is connected. The entire structure is very durable, simple in construction, and economical to manufacture.

It will be understood that modifications and variations may be effected without departing from the scope of the novel concepts of the present invention.

I claim as my invention:

1. In a liquid bath air cleaner, a casing having separated inlet and outlet openings and comprising separable sections of which the lower contains a liquid sump, a filter holding shell in said casing through which air traveling through the cleaner must pass, said shell being of less diameter than said casing to define a path therebetween for incoming air leading towards said sump, filter means in said shell above said sump, a centrally open annular and transversely curvate baffle adjacent said sump below said air path, and tongues struck inwardly and upwardly from the lower wall portion of said shell to guide air and cleansing liquid driven by back pressure outwardly and downwardly toward said baffle.

2. In a liquid bath air cleaner, a casing having separated inlet and outlet openings and comprising separable sections of which the lower contains a liquid sump, a filter holding shell in said casing through which air traveling through the cleaner must pass, said shell being of less diameter than said casing to define a path therebetween for incoming air leading towards said sump, filter means in said shell above said sump, a baffle adjacent said sump below said air path, said shell having openings in the wall of the lower part thereof to bypass air and cleansing liquid driven by back pressure, and means adjacent said openings extending obliquely inwardly and upwardly to guide fluids driven by back pressure outwardly into said path and toward said baffle.

3. In a liquid bath air cleaner, a casing having separated inlet and outlet openings and comprising separable sections of which the lower contains a liquid sump, a filter holding shell in said casing through which air traveling through the cleaner must pass, said shell being of less diameter than said casing to define a path therebetween for incoming air leading towards said sump, filter means in said shell above said sump, a baffle adjacent said sump below said air path, said shell having openings in the lower part of the wall thereof, upwardly and inwardly sloping tongues adjacent said openings to guide fluid driven by back pressure toward said baffle, and said baffle having an upwardly and inwardly inclined wall substantially parallelling said tongues.

4. In a liquid bath air cleaner, a casing having separated inlet and outlet openings and comprising separable sections of which the lower contains a liquid sump, a filter holding shell in said casing through which air traveling through the cleaner must pass, said shell being of less diameter than said casing to define a path therebetween for incoming air leading towards said sump, filtering means in said shell above said sump, a baffle adjacent said sump below said air path, said baffle in the lower casing section being centrally open and annular in character, said baffle being trough-like with a steep outer wall curving into an inwardly and upwardly sloping inner wall, said shell having openings in the lower wall portion thereof, and guide means adjacent said openings to direct fluid driven by back pressure outwardly and downwardly into the trough of said baffle.

5. In a liquid bath air cleaner, a casing comprising upper and lower separable sections of which the lower houses a liquid sump, the upper section comprising a pair of concentric shells defining therebetween an annular air inlet leading toward said sump, two-part filter means in superposed arrangement in the inner of said shells above the sump, the upper portion of said filter means being at least twice the length of the lower portion, means holding the upper portion of the filter means fixedly in position, a separate shell around the lower portion of the filter means telescopically associated with the inner of the concentric shells, means removably holding the lower portion of the filter means in place, said casing having an outlet on the other side of said filter means from said inlet, a centrally open annular baffle in the lower casing section adjacent the sump and below said inlet, said separate shell having openings near the lower end thereof, and inwardly and upwardly extending tongues beneath said openings to direct fluid driven by back pressure toward said baffle.

References Cited in the file of this patent

UNITED STATES PATENTS

| | | |
|---|---|---|
| 1,499,864 | Gordon | July 1, 1924 |
| 2,062,548 | Wilson | Dec. 1, 1936 |
| 2,251,790 | Hallerberg | Aug. 5, 1941 |
| 2,269,663 | Hallerberg et al. | Jan. 13, 1942 |

FOREIGN PATENTS

| | | |
|---|---|---|
| 461,528 | Canada | Nov. 29, 1949 |